(12) United States Patent
Bathel et al.

(10) Patent No.: US 12,072,286 B2
(45) Date of Patent: Aug. 27, 2024

(54) METHODS AND APPARATUS FOR A SELF-ALIGNED DIGITAL PROJECTION AND REFLECTED GLARE REDUCTION IMAGING SYSTEM

(71) Applicant: UNITED STATES OF AMERICA AS REPRESENTED BY THE ADMINISTRATOR OF NASA, Washington, DC (US)

(72) Inventors: Brett F. Bathel, Yorktown, VA (US); Joshua M. Weisberger, Newport News, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 378 days.

(21) Appl. No.: 17/490,612

(22) Filed: Sep. 30, 2021

(65) Prior Publication Data
US 2022/0299437 A1    Sep. 22, 2022

Related U.S. Application Data

(60) Provisional application No. 63/163,290, filed on Mar. 19, 2021.

(51) Int. Cl.
*G01N 21/45* (2006.01)
*G01N 21/958* (2006.01)
*G02B 27/54* (2006.01)

(52) U.S. Cl.
CPC ......... *G01N 21/455* (2013.01); *G01N 21/958* (2013.01); *G02B 27/54* (2013.01)

(58) Field of Classification Search
CPC .... G01N 21/455; G01N 21/958; G01N 21/21; G02B 27/54; G02B 27/283
See application file for complete search history.

(56) References Cited

U.S. PATENT DOCUMENTS

| 5,515,158 A | 5/1996 | Heineck |
| 11,650,151 B2 * | 5/2023 | Bathel .................. G01N 21/455 356/129 |

(Continued)

OTHER PUBLICATIONS

L.M. Weinstein, "Review and update of lens and grid schlieren and motion camera schlieren," The European Physical Journal Special Topics, 2010, pp. 65-95, 2010, vol. 182, No. 1.

(Continued)

*Primary Examiner* — Violeta A Prieto
(74) *Attorney, Agent, or Firm* — M. Bruce Harper; Robin W. Edwards; Trenton J. Roche

(57) ABSTRACT

A digital projection and reflected glare reduction system according to various aspects of the present technology may include a digital display device capable of generating a one or two dimensional source grid pattern back-illuminated by a light source to project an image of a source grid onto a retroreflective background. The projected source grid image may then be re-imaged onto the original grid element at a slight offset eliminating the need to generate a separate cutoff grid thereby reducing the amount of time required to setup and adjust the system. The digital display device is also capable of switching between a schlieren visualization capability to some other visualization capability (such as particle tracking velocimetry (PTV), particle imaging velocimetry (NV), temperature sensitive paint measurements (TSP), pressure sensitive paint measurements (PSP), photogrammetry, etc.) allowing for the simultaneous use of two different imaging techniques.

14 Claims, 4 Drawing Sheets

(56) References Cited

U.S. PATENT DOCUMENTS

| | | | |
|---|---|---|---|
| 11,796,469 B2* | 10/2023 | Weisberger | G01B 11/2513 |
| 2022/0113251 A1* | 4/2022 | Bathel | G01B 11/2513 |
| 2023/0123777 A1* | 4/2023 | Weisberger | G01P 5/001 |
| | | | 356/129 |
| 2024/0027342 A1* | 1/2024 | Weisberger | G01B 11/2513 |

OTHER PUBLICATIONS

Biss et al., Differential schlieren-interferometry with a simple adjustable Wollaston-like prism, Applied Optics, 2008, pp. 328-335, vol. 47, No. 3.
L.M. Weinstein, "Large-field high-brightness focusing schlieren system," AIAA Journal, 1993, pp. 1250-1255, vol. 31.
Fagan et al., "Application of a novel projection focusing schlieren system in NASA test facilities," 30th AIAA Aerodynamic Measurement Technology and Ground Testing Conference, 2014, pp. 1-14, Atlanta, GA.
Buckner et al., "Digital focusing schlieren imaging," Applied Advanced Optical Metrology Solutions, Proceedings of SPIE, 2015, pp. 95760C-1-95760C-8, vol. 9576, San Diego CA.
L'Esperance et al., "Focusing schlieren systems using digitally projected grids," Proceedings of SPIE, 2017, pp. 103730R-1-103730R-10, vol. 10373, San Diego CA.
Buckner et al., "Schlieren unwrapped: distortion correction in digital focusing schlieren," Proceedings of SPIE, 2019, pp. 111020R-1-1111020R-9, vol. 11102, San Diego CA.
Small et al., "Single Beam Schlieren Interferometer Using a Wollaston Prism," Applied Optics, 1972 11(4), pp. 858-862, vol. 11 No. 4.

* cited by examiner

METHODS AND APPARATUS FOR A SELF-ALIGNED DIGITAL PROJECTION AND REFLECTED GLARE REDUCTION IMAGING SYSTEM

CROSS-REFERENCE TO RELATED PATENT APPLICATION(S)

This patent application claims the benefit of and priority to U.S. Provisional Patent Application Ser. No. 63/163,290, filed on Oct. 8, 2020, the contents of which are hereby incorporated by reference in their entirety for any and all non-limiting purposes. The present application is also related to U.S. patent application Ser. No. 17/490,521, now issued as U.S. Pat. No. 11,650,151 filed concurrently on Sep. 30, 2021, the contents of which are hereby incorporated by reference in their entirety for any and all non-limiting purposes.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE TECHNOLOGY

Several basic focusing schlieren system designs have previously been used to perform focusing schlieren visualization measurements. The most common design is the modern focusing/large-field schlieren system. Here, a light source back-illuminates a source grid, with a Fresnel lens placed just in front of the source grid to better couple the light into the camera lens and thus improve signal and sensitivity. The source grid is imaged onto a cutoff grid with the primary lens and the resulting focused schlieren image captured on the image plane. Here, the placement of the source grid and cutoff grid relative to the primary lens are determined using the thin lens equation. Similarly, the placement of the density object and image plane are determined using the thin lens equation. A one-dimensional or two-dimensional grid element can be used in this setup, however the time and effort needed to switch between configurations is relatively significant as fabrication and precise alignment of the source and cutoff grids is required.

A retroreflective variant of the modern focusing/large-field schlieren system couples a light source onto the optical axis of the instrument using a beamsplitter. Light then illuminates a retroreflective sheet with a series of regularly-spaced black lines printed on it. This retroreflective sheet with dark lines serves as the source grid. The image of this source grid is then imaged onto a matching cutoff grid using an imaging lens on the opposing side of the density object, with the remainder of the setup being the same as that of the modern focusing/large-field schlieren system described above. As with the common focusing schlieren system, either a one-dimensional or two-dimensional grid element can be used in this setup, but the same time/effort issues exist if the user decides to switch between configurations.

A projection focusing schlieren system uses a transparent source grid (e.g. Ronchi ruling) back-illuminated by a pulsed light source. The image of this source grid is then coupled onto the instrument's optical axis using a beamsplitter plate and projected onto a retroreflective background on the opposing side of the density object. The projected image of the source grid is then re-imaged by lenses onto a matching cutoff grid located behind the beamsplitter plate, and a relay lens is used to re-image the image plane of the density object onto a camera sensor. As with the common focusing schlieren system described above, either a one-dimensional or two-dimensional grid element can be used in this setup, but again the user must expend time and effort to switch between configurations.

A digital projection focusing schlieren system may use a panel display (e.g. LCD, LED, etc.) to generate a digital source grid that is re-imaged onto the conventional cutoff grid with a primary lens on the opposing side of the density object. The image plane is then re-imaged onto the camera sensor with a relay lens. A unique aspect of this system is that a computer algorithm can be used to adjust a source image displayed on the digital panel device to achieve a high degree of overlap between the re-imaged source grid and cutoff grid. Additionally, both one-dimensional and two-dimensional grid patterns can be displayed allowing for relatively quick adjustments to the sensitivity direction of the schlieren measurement relative to the instrument's optical axis. Recently, this approach has been extended to include the use of a transparent liquid-crystal display (LCD) that is back-illuminated by a pulsed laser light source.

In each of these focusing schlieren systems, two separate grids (a source grid and a cutoff grid) are always required. There are two major drawbacks of having a separate source grid and cutoff grid in a focusing schlieren system. First, it is difficult to create a cutoff grid that is well matched and properly scaled to the re-imaged source grid. The most common method involves placing high-contrast photographic film at the cutoff grid location and developing the film such that an image of the source grid is obtained with sharp edges and a high extinction ratio. Other methods include using digital flat panel displays to tailor the source grid such that it is matched to the cutoff grid. The second major drawback of a focusing schlieren system is the need to achieve nearly perfect alignment between the image of the source grid and the cutoff grid. For film-based cutoff grids, after the initial film grid is developed, it must be re-installed in the focusing schlieren system and a significant effort put forth to re-align the image of the source grid to the cutoff grid. Compounding the problem is the fact that over time, the film-based cutoff grid can become warped and distorted and a new cutoff grid developed. Optical aberrations in the imaging optics also degrade performance of the focusing schlieren system. Digital projection methods alleviate some of the difficulty in obtaining precise alignment between source and cutoff grids, however these methods limit application to lower-speed flows as the camera exposure must be sufficiently long to capture enough light from the digital panel projector to obtain enough signal in the image. What is needed, therefore, are improved systems and methods that reduce or eliminate one or more drawbacks associated with the prior-art systems.

BRIEF SUMMARY OF THE TECHNOLOGY

A self-aligned digital projection and reflected glare reduction system according to various aspects of the present technology may include a single grid element back-illuminated by a light source to project an image of a source grid onto a retroreflective background. The projected source grid image may then be re-imaged onto the original grid element at a slight offset.

One embodiment of the technology is a digital projection system that can be used to reduce setup and adjustment time of a focusing schlieren system associated with the preparation and positioning of a source grid and a cutoff grid.

Another embodiment of the technology is a digital projection focusing schlieren system that does not require a separate cutoff grid.

Another embodiment of the technology is a digital projection focusing schlieren system that allows for off-axis measurements.

Another embodiment of the technology is a digital projection focusing schlieren system that allows for the transmission of particular colors through the source grid created by the LCD element.

Another embodiment of the technology is an imaging system that reduces glare and reflections from one or more windows between an imaging sensor and a retroreflective background.

These and other features, advantages, and objects of the present technology will be further understood and appreciated by those skilled in the art by reference to the following specification, claims, and appended drawings.

DETAILED DESCRIPTION OF EXEMPLARY EMBODIMENTS

Figure 1:
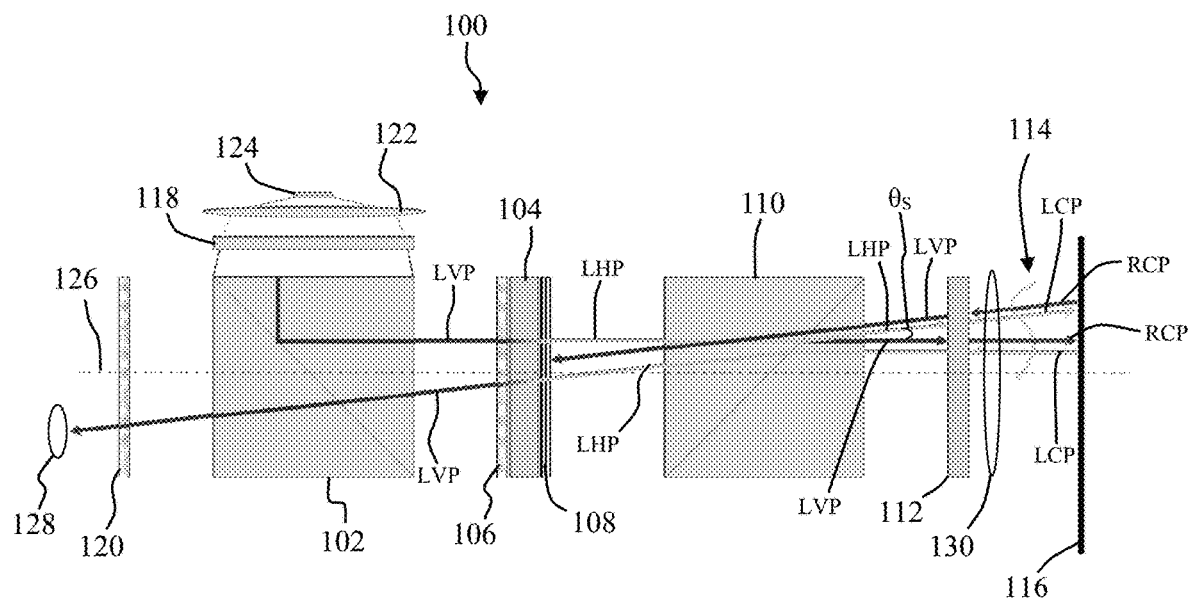
FIG. 1 representatively illustrates a block diagram of a projection system in accordance with an exemplary embodiment of the present technology.

For purposes of description herein, the terms "upper," "lower," "right," "left," "rear," "front," "vertical," "horizontal," and derivatives thereof shall relate to the technology as oriented in FIG. 1. However, it is to be understood that the technology may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present technology may be described in terms of functional block components and various processing steps. Such functional blocks may be realized by any number of components configured to perform the specified functions and achieve the various results. For example, the present technology may employ various optical devices, materials, and geometries, which may carry out a variety of operations. In addition, the technology described is merely one exemplary application for the disclosed device. Further, the present technology may employ any number of techniques or methods of redirecting, focusing, expanding, polarizing, or manipulating a laser beam or other like beam of light.

Methods and apparatus for a self-aligned projection and reflection reduction imaging system according to various aspects of the present technology may operate in conjunction with any type of image-based measurement system such as a focusing schlieren system or a target based imaging system. Various representative implementations of the present technology may be applied to any type of image projecting device or optical measurement system for measuring one or more features on a test object, such as a density object, in a test section. Referring now to FIG. 1, in one representative embodiment, a digital projection system 100 may comprise a beam splitter 102 positioned to receive light from a light source 124 and reflect at least a portion of the incident light comprising linear vertically polarized (LVP) light towards an LCD element 104 along an optical axis 126 of the instrument. The incident light provided by the light source 124 may initially be passed through a condenser lens 122 to diffuse the light and a first linear polarizer 118 to create LVP light before reaching the beam splitter 102. A remaining portion of the incident light may be transmitted through the beam splitter 102 and away from the optical axis 126 towards a device such as a light trap.

A first polarizer 106 may be located on a first side of the LCD element 104 and a second polarizer 108 may be positioned on an opposite second side of the LCD element 104. The first polarizer 106 may comprise a vertical transmission axis to allow the LVP light to pass into the LCD element 104. The LCD element 104 may further comprise a selectable pixel element positioned between the first and second polarizers 106, 108 that may be set between a first transparent state and a second opaque state to generate the source grid. The source grid may comprise any suitable size, shape, or design and may exist in one or two dimensions according to a desired application.

When the selectable pixel element is set to the transparent state, liquid crystals within the pixel element that correspond to the source grid may rotate the LVP light by 90 degrees to form a light beam that is now linear horizontally polarized (LHP). The second polarizer 108 is oriented orthogonal to the first polarizer 106 thereby allowing the LHP light to be transmitted out of the LCD element 104. Conversely, if the selectable pixel element is set to the opaque state, then the incoming LVP light is not rotated and is blocked by the second polarizer 108 from being transmitted out of the LCD element 104.

A polarizing prism 110 is positioned adjacent to the LCD element 104 and configured to receive LHP light that is transmitted out of the LCD element 104. In one embodiment, the polarizing prism 110 may comprise a Rochon prism suitably configured to receive LHP light on a first side and split the light beam into two separate orthogonally polarized beams LVP, LHP that exit from an opposing side of the polarizing prism 110. The manner in which the light is split is dependent on how the Rochon prism is oriented to the incoming light.

For example, if the Rochon prism is arranged in a particular orientation, the output will consist of a polarization state that is changed to LVP and is unrefracted while another portion of the light remains LHP and is refracted by small angle. More specifically, the two orthogonally polarized beams LVP, LHP may be split by an angle about the optical axis 126. For example, the Rochon prism may be configured to split the incoming LHP light into two beams by a splitting angle (θs). A first beam of LHP light may be angled from the optical axis 122 by θs and the second beam of LVP light may continue along the optical axis 126.

A quarter-wave plate (QWP) 112 is positioned between the polarizing prism 110 and a test object in a test section (e.g., a density object 114 that is the subject of the measurement) and conditions the polarization of the transmitted light prior to passing through the density object 114. As the two orthogonally polarized beams LVP, LHP pass through the QWP 112, their states are altered such that the LVP light is modified to be right-circularly polarized (RCP) and the LHP light is modified to be left-circularly polarized (LCP).

An imaging lens 130 may be positioned between the LCD element 104 and the density object 114 to project an image of the source grid generated by the LCD element 104 onto a retroreflective background 116. The imaging lens 130 may be positioned at any desired location between the LCD element 104 and the density object. For example, in one embodiment, the imaging lens 130 may be positioned between the QWP 112 and the density object 114. In an alternative embodiment, the imaging lens 130 may be positioned between the LCD element 104 and the polarizing prism 110. In yet another embodiment, the imaging lens 130 may be located between the polarizing prism 110 and the QWP 112. The exact location of the imaging lens 130 may be selected according to any suitable factors such as a desired application, the size or shape of source grid being used, or the type of components being used.

The two circularly polarized beams RCP, LCP then pass through the density object 114 and are refracted slightly before reaching a retroreflective background 116 located on the other side of the density object 114. The retroreflective background 116 is configured to reflect the two circularly polarized beams RCP, LCP back through the density object 114 and towards the QWP 112. Importantly, when the two circularly polarized beams RCP, LCP are reflected the handedness of the circular polarization states are reversed such that the RCP beam becomes LCP and the LCP beam becomes RCP.

The two circularly polarized beams LCP, RCP then pass through the density object 114 a second time and are refracted slightly once again. The reflected beams LCP, RCP then pass through the quarter wave plate in the reverse direction and are modified back into linear polarized light such that the LCP light is modified to LHP light and the RCP light is modified to LVP light.

The projected source grid is also reflected off of the retroreflective background 116 and directed back towards the imaging lens 130 which then reimages the projected source grid onto the original grid on the LCD element.

The two beams LHP, LVP then continue on to the polarizing prism 110. If the polarizing prism 110 is a Rochon prism, the LHP light is refracted by a small angle before exiting the prism and the LVP light is transmitted without refraction and exits the prism roughly parallel to the LHP light.

The two beams LHP, LVP continue towards the LCD element 104 where the LVP light is blocked by the second polarizer 108. The LHP light passes through the second polarizer 108 and into the LCD element 104 where the selectable pixel element rotates the LHP light by 90 degrees to form LVP light which is able to pass through the first polarizer 106 and exit the LCD element 104.

The single LVP light beam may then continue through the beam splitter 102 before being directed towards a sensor 128 such as a camera. A second linear polarizer 120 may be positioned between the sensor 128 and the beam splitter 102 to reject and light that is not LVP from reaching the sensor 128.

Figure 2:
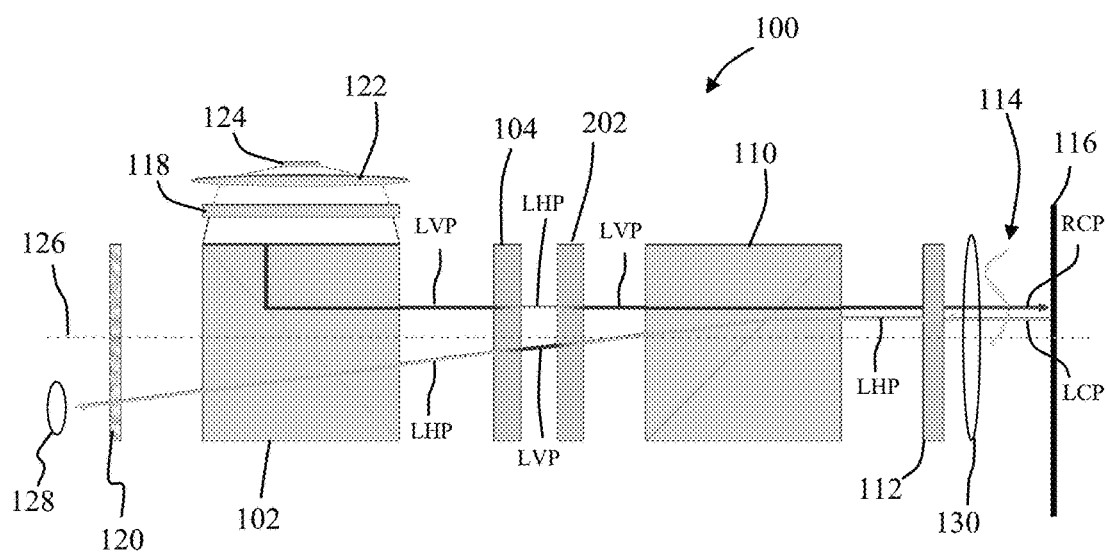
FIG. 2 representatively illustrates a block diagram of an alternative embodiment of the projection system in accordance with an exemplary embodiment of the present technology.

Referring now to FIG. 2, in an alternative representative embodiment, the digital projection system 100 may comprise the same components arranged in the same order except that the beam splitter 102 may comprise a polarized beam splitter and the LCD element 104 may not be configured with a first and second polarizer 106, 108. Additionally, a half-wave plate (HWP) 202 may be positioned between the LCD element 104 and the polarizing prism 110. In this embodiment, the polarizing beams splitter may transmit LHP light and reflect LVP light onto the optical axis 126 of the instrument and towards the LCD element 104.

As described above, the LCD element 104 may comprise a selectable pixel element that may be set between a first transparent state and a second opaque state to generate a source grid. When the selectable pixel element is set to the transparent state, liquid crystals within the pixel element may rotate the LVP light by 90 degrees to form a light beam that is now LHP. In contrast to the embodiment described with respect to FIG. 1, because there are no polarizers present on the incoming and exiting sides of the LCD element 104, the overall intensity of the LHP light exiting the LCD element 104 is the same as the LVP light entering the LCD element 104, just with altered polarization states for some portions depending on the source grid/image displayed on the LCD element 104. It is noted for clarity that only light that is passed through transparent portions of the LCD element 104 is shown in FIG. 2 but both LVP and LHP would be present in a real-world setup.

For example, where the opaque grid lines have been requested (by the operator of the system), the outgoing polarization state from the LCD element 104 has not been changed, and the light exits as LVP. Similarly, where transparent grid lines have been requested, the outgoing polarization state from the LCD element is changed and the light exits as LHP. The mix of alternating LVP/LHP light then passes through the HWP 202 which is oriented such that their linear polarization states are rotated by 90 degrees such that LHP light becomes LVP light and the LVP light becomes LHP light.

As described above, an imaging lens 130 is used to project an image of the generated source grid onto the retroreflective background 116. The imaging lens 130 may be positioned at any point between the LCD element 104 and the density object 114. For example, as shown in FIG. 2, the imaging lens 130 is located between the QWP 112 and the density object 114.

The LVP light exiting the HWP 202 (which corresponds to the transparent grid lines after HWP rotation) proceeds towards the polarizing prism 110 and is transmitted through the polarizing prism 110 unrefracted. The LHP light exiting the HWP 202 (which corresponds to the opaque grid lines after HWP 202 rotation and is not shown) is transmitted through the polarizing prism 110 refracted by a small angle.

As described above, the two light beams LVP, LHP exiting the polarizing prism 110 continue towards the QWP 112 where they are modified to either RCP or LCP light. More specifically, the LVP light is modified to RCP light as shown in FIG. 2 and LHP light is modified to LCP light.

Again, the two circularly polarized beams RCP, LCP then pass through the density object 114 and are refracted slightly before reaching a retroreflective background 116 located on the other side of the density object 114. The retroreflective background 116 is configured to reflect the two circularly polarized beams RCP, LCP back through the density object 114 and towards the QWP 112. Importantly, when the two circularly polarized beams RCP, LCP are reflected the handedness of the circular polarization states are reversed such that the RCP beam becomes LCP and the LCP beam becomes RCP.

The two circularly polarized beams LCP, RCP then pass through the density object 114 a second time and are refracted slightly once again. The reflected beams LCP, RCP then pass through the QWP 112 in the reverse direction and are modified back into linear polarized light such that the LCP light is modified to LHP light and the RCP light is modified to LVP light.

The two beams LHP, LVP then continue on to the polarizing prism 110. If the polarizing prism 110 is a Rochon prism, the LHP light is refracted by a small angle before exiting the prism and the LVP light is transmitted without refraction and exits the prism along the optical axis 126.

The LHP light then passes through the HWP 202 and its polarization state is modified from LHP to LVP. The LVP light then passes through the LCD element and, if the element corresponds to a transparent pixel on the grid, its polarization state is rotated by 90 degrees to become LHP light. This LHP light is then allowed to pass through the beam splitter 102 and towards the sensor 128. A second linear polarizer 120 can then be used to further improve image contrast prior to the light terminating on the sensor 128.

When the LVP light exiting the polarizing prism 110 reaches the LCD element 104 and encounters an opaque portion of the digital grid, its polarization orientation remains unaffected. This ultimately results in light that is passed through designated opaque portions of the digitally-generated grid towards the sensor 128 that is LVP rather than LHP. This LVP light is then primarily reflected out of the instrument by the polarizing beam splitter 102. The second linear polarizer 120 may also provide additional filtering of any LVP light that is not reflected away from the sensor 128.

The LCD element 104 is used to generate a one-dimensional or two-dimensional source grid. The LCD element 104 may comprise any suitable LCD device such as: LED, TFT, OLED, CSTN, and the like. The source grids may be generated using any number of software products capable of generating computer graphics and can easily be uploaded to the LCD element 104. For example, a single digital grid-generating element may be used to generate the source grid that is projected (much like a movie projector) onto the retroreflective background 116 by the imaging lens 130. This generated source grid in the LCD element 104 also serves as a cutoff grid, thereby eliminating the need for a separate cutoff grid in the system.

A pattern for the source grid may be generated by switching individual pixels within the LCD element 104 between a transparent state or an opaque state according to a desired transmission of the incident light source. The source grid may then be used to either alter the polarization state of the light passing through the LCD element 104 or leave it unaltered.

The LCD element 104 may be configured to be connected to a control board that can interface with a computer via any suitable connection such as an HDMI input port. In one embodiment, a first piece of polarizing film may be adhered to a first surface of the LCD element with a transmission axis aligned in a first direction. A second piece of polarizing may be film adhered to a second surface of the LCD element opposite the top surface. The second piece of polarizing film may be oriented to provide a transmission axis orthogonal to the first piece of polarizing film. When none of the pixels in the LCD element 104 are active (e.g., the selectable pixel elements are in the opaque state), then light passing through either surface of the LCD element maintains a constant polarization orientation and is blocked by the polarizing film on the opposite side.

An added benefit of the disclosed system is that the digital LCD element 104 can be rendered fully transparent. When this happens, the instrument no longer provides sensitivity to density gradient information and becomes a tightly focused imaging system. This allows a user to quickly switch from a schlieren visualization capability to some other visualization capability (such as particle tracking velocimetry (PTV), particle imaging velocimetry (NV), temperature sensitive paint measurements (TSP), pressure sensitive paint measurements (PSP), photogrammetry, etc.). This feature provides flexibility for a user interested in performing multiple image-based measurement techniques with a single imaging system.

Figure 3:
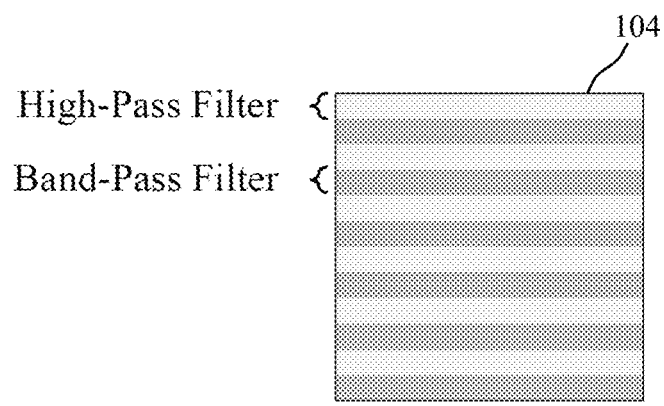
FIG. 3 representatively illustrates a front view of an LCD element in accordance with an exemplary embodiment of the present technology.

While switching between two imaging techniques in this manner offers a unique capability, it does not allow for truly simultaneous imaging with two techniques as the time required for the LCD element 104 to switch from a focusing schlieren grid pattern to being fully transparent may be longer than the flow timescale of interest. In certain testing situations, a simultaneous measurement capability may be required where both a digital projection focusing schlieren and another non-schlieren imaging technique (e.g., PIV, PTV, TSP, PSP, photogrammetry, etc.) are needed. To allow for the application of simultaneous measurement techniques, both the polarization and color transmission capabilities of the digital LCD element 104 can be used in conjunction with a two-color light source. Referring now to FIG. 3, the LCD element may be configured to display a one-dimensional, two-color grid pattern. Here, high-pass regions of the grid may be the result of setting both the red and green pixels of the LCD element to be fully transmitting. Band-pass regions of the grid may correspond to only green pixels being fully transmitting. For example, when a two-color light source consisting of both red and green light is placed behind the LCD element 104, the high-pass regions of the grid will pass both colors while the band-pass regions of the grid will pass only green.

Figure 4:
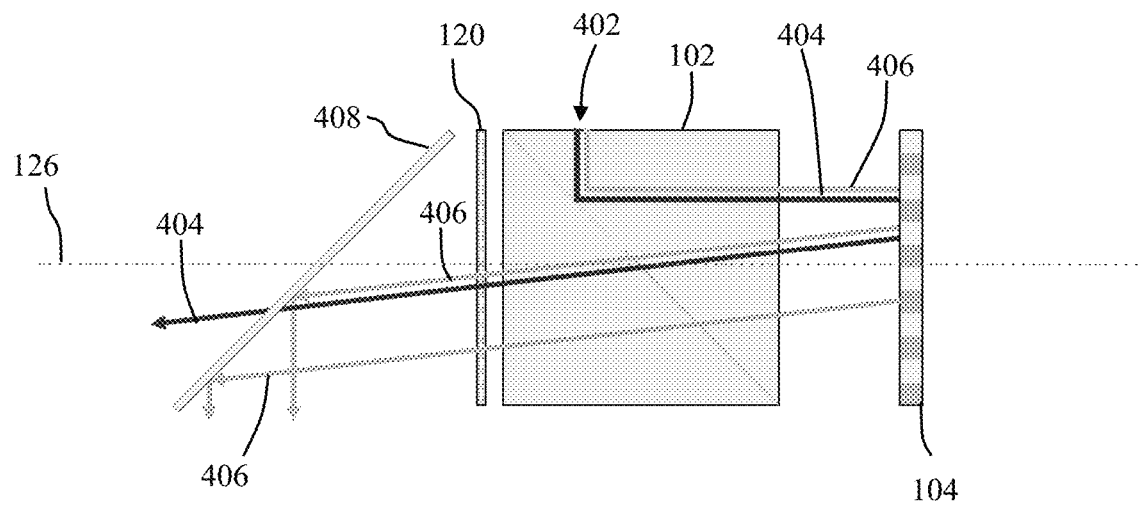
FIG. 4 representatively illustrates a block diagram of a two color digital projection in accordance with an exemplary embodiment of the present technology.

Referring now to FIG. 4, this two-color method may be implemented in the digital projection focusing schlieren system 100 shown in either FIG. 1 or 2. Here, a two-color light source 402 consisting of both red light 404 and green light 406 may be coupled into the system via the beamsplitter 102. As the two colors of light pass through the LCD element 104 towards the retroreflective background (not shown), portions of the red light 404 are blocked by areas where only green pixels are set to be transmitting, whereas all of the green light 406 incident on the LCD element 104 is fully transmitted. After the green light 406 and filtered red light 404 pass through the rest of the system (not shown) and return to the LCD element 104, any refracted red light 404 rays incident on areas of the LCD element 104 that are only green-transmitting are again blocked, whereas all of the green light 406 is again fully transmitted. After passing through the beamsplitter 102 and the second linear polarizing filter 120, the light is made to be incident on a dichroic mirror 408 oriented at 45 degrees relative to the instrument's optical axis 126. Here, any of the filtered red light 404 is allowed to pass through the dichroic mirror 408 while the green light 406 is reflected by the dichroic mirror 408, assuming a long-pass dichroic mirror 408 is used. Conversely, a short-pass dichroic mirror 408 could be used that would fully transmit the green light 406 and reflect the filtered red light 404. Two cameras may then be used to image the filtered red light 404 as well as the unfiltered green light 406, providing for simultaneous digital projection focusing schlieren and conventional imaging capabilities, respectively. Note that in order to reduce the complexity of the instrument while providing a simultaneous measurement capability, the dichroic mirror 408 element could be removed and a color camera used to image both the green light 406 and filtered red light 404. The images would then need to be post-processed to separate out the green light 406 and filtered red light 404 image components corresponding to the conventional and digital projection focusing schlieren techniques, respectively. One of ordinary skill in the art will recognize that while a simultaneous two-color, two-technique approach has been described here, it is also possible to extend this to a multi-color technique, thus enabling a simultaneous multi-technique capability (e.g., more than two simultaneous imaging techniques including digital projection focusing schlieren imaging).

Figure 5:
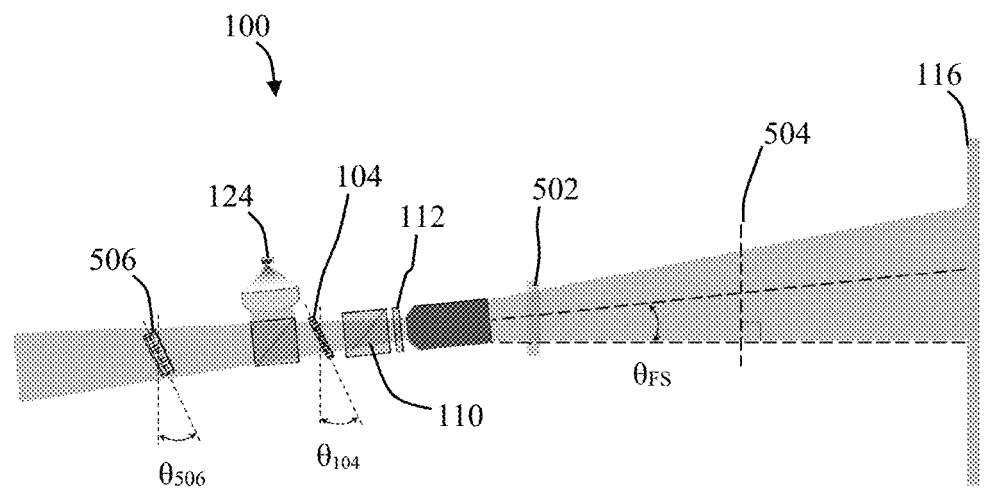
FIG. 5 representatively illustrates a block diagram of the projection system used in an off-axis configuration in accordance with an exemplary embodiment of the present technology.

Referring now to FIG. 5, the Scheimpflug principle can also be applied to this system to enable imaging of in-focus planes that are not orthogonal to the instrument's optical axis 126. For example, it is often the case when testing in a wind tunnel with limited optical access that the region of interest can be either upstream or downstream of a tunnel window 502 used for focused schlieren imaging. In this case, viewing the model orthogonal to the tunnel axis 504 would result in a measurement too far downstream or upstream on the model, respectively. By angling the digital grid element 104 relative to the optical axis 126, the projected source grid can be uniformly focused onto the retroreflective background 116 when the instrument's optical axis 126 is placed at an angle $\theta_{FS}$. By also angling the camera sensor 506 by an angle $\theta_{506}$ relative to the optical axis 126 of the instrument, a uniformly-focused image from an image plane either upstream or downstream of the instrument can be obtained.

Referring now to FIGS. 2 and 6-8, in an embodiment where the LCD element 104 is not configured with polarizers and the selectable pixel elements are set to be fully transmitting so that the system 100 acts as a conventional imaging system, the quarter wave plate 112 may be positioned to reduce reflections caused by one or more windows 602, 604 that provide visual access to a test section 606. More specifically, light from the light source 124 may be linearly polarized and reflected onto the optical axis 126 of the imaging system via the beam splitter 102. The light then passes through the LCD element 104 without being altered and across the QWP 112 that modifies the linearly polarized light to circularly polarized light in the manner described above. This circularly polarized light is then reflected by the retroreflective background 116 and the handedness of circular polarization is reversed as previously detailed. After passing through the QWP 112 a second time, the circularly polarized light (with the handedness of the polarization reversed relative to the incident light) is converted to linearly polarized light, but with an orientation that is perpendicular to the initially outgoing linearly polarized light and passes to the beam splitter 102. This light is then transmitted by the beam splitter 102 towards the sensor 128. Any light reflected back to the beam splitter 102 directly off the windows 602, 604 is reflected back with the same polarization as the incident light. The orientation of the beam splitter 102 is such that the light reflected off the window 602, 604 is reflected out of the system rather than being transmitted through the beam splitter 102 towards the sensor 128.

The second linear polarizer 120 may then be used to further improve image contrast by aligning its transmission axis to the transmission axis of the beam splitter 102. The sensor 128 then images the transmitted light. The cross-polarized nature of this imaging system results in images that are nearly or completely free of reflections from windows 602, 604 that are placed between the sensor 128 and the retroreflective background 116.

Figure 6:
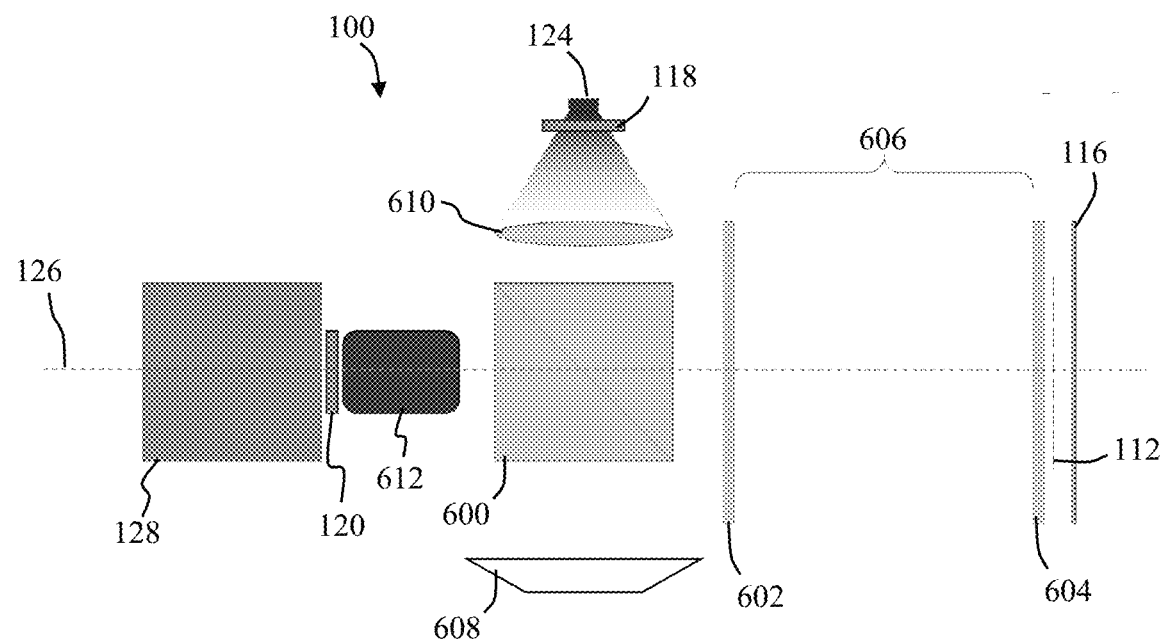
FIG. 6 representatively illustrates a projection system of a first glare reduction embodiment in accordance with an exemplary embodiment of the present technology.

With particular reference now to FIG. 6, in one embodiment, the light source 124, which can either be unpolarized or polarized, may be passed through a first linear polarizer 118 that is rotated such that its transmission axis is parallel to the reflection axis of a polarizing beam splitter 600 The first linear polarizer 118 helps ensure that highly linearly polarized light is coupled/reflected onto the imaging system's optical axis 126 (which is coaxial with a line intersecting the center of the sensor 128 and retroreflective background 116). An optional conditioning lens 610 or other spatial filtering element (such as an adjustable aperture) may be placed between the first linear polarizer 118 and polarizing beam splitter 102 to condition the apparent size and divergence of the light source 124. Upon reflection in the polarizing beam splitter 102, the linearly polarized light is coupled onto the imaging system's optical axis 126 and passes through the test section windows 602, 604 and the test section 606 of a wind tunnel. Any light initially transmitted by the polarizing beam splitter 102 may be captured by a light trap 608 on the side opposite the light source 124. As the light is transmitted through the QWP 112 on the opposing side of the test section 606, its polarization state is modified, and it becomes circularly polarized. The light then reflects off of the retroreflective background 116 and is directed back towards the imaging system with its handedness of circular polarization reversed as a result of the reflection. As this light is transmitted through the QWP 112 a second time, the polarization state reverts to being linearly polarized. However, the direction of linear polarization is orthogonal to the initial linear polarization state, allowing it to be fully transmitted by the polarizing beam splitter 102 towards the sensor 128. After passing through an imaging lens 612, the second linear polarizer 120 may be used to reject any light with a linear polarization state other than that aligned to the transmission axis of the polarizing beam splitter 102. The sensor 128 then records the final intensity pattern.

Figure 7:
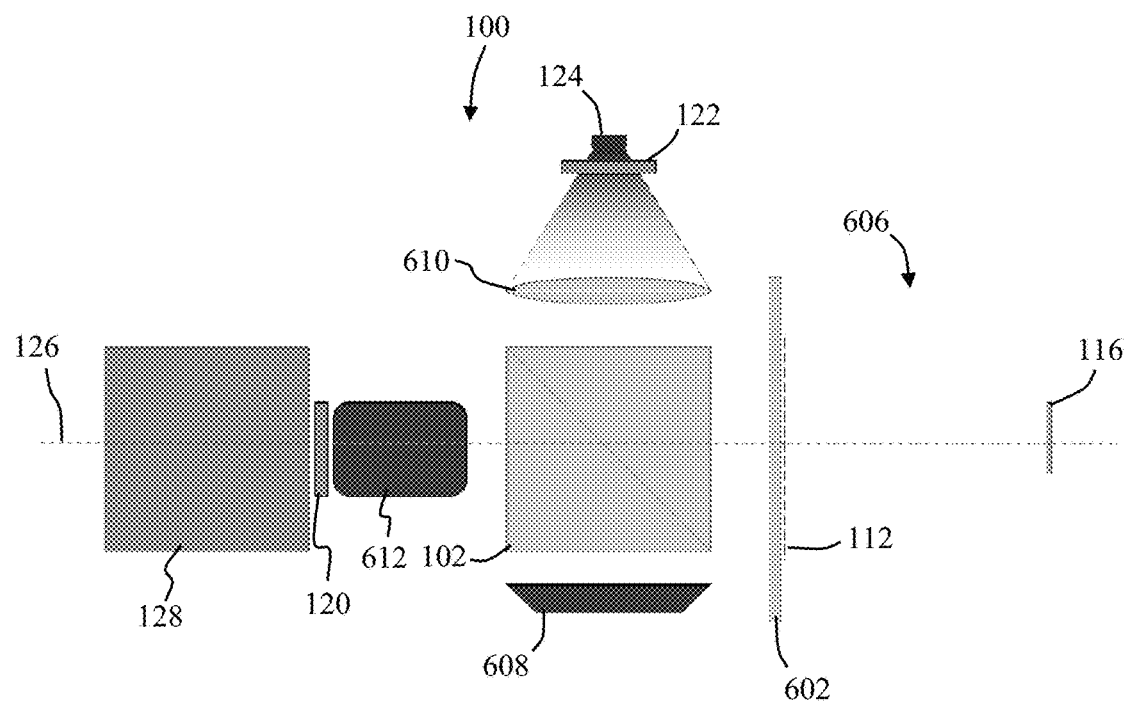
FIG. 7 representatively illustrates a projection system of a second glare reduction embodiment in accordance with an exemplary embodiment of the present technology.
Figure 8:
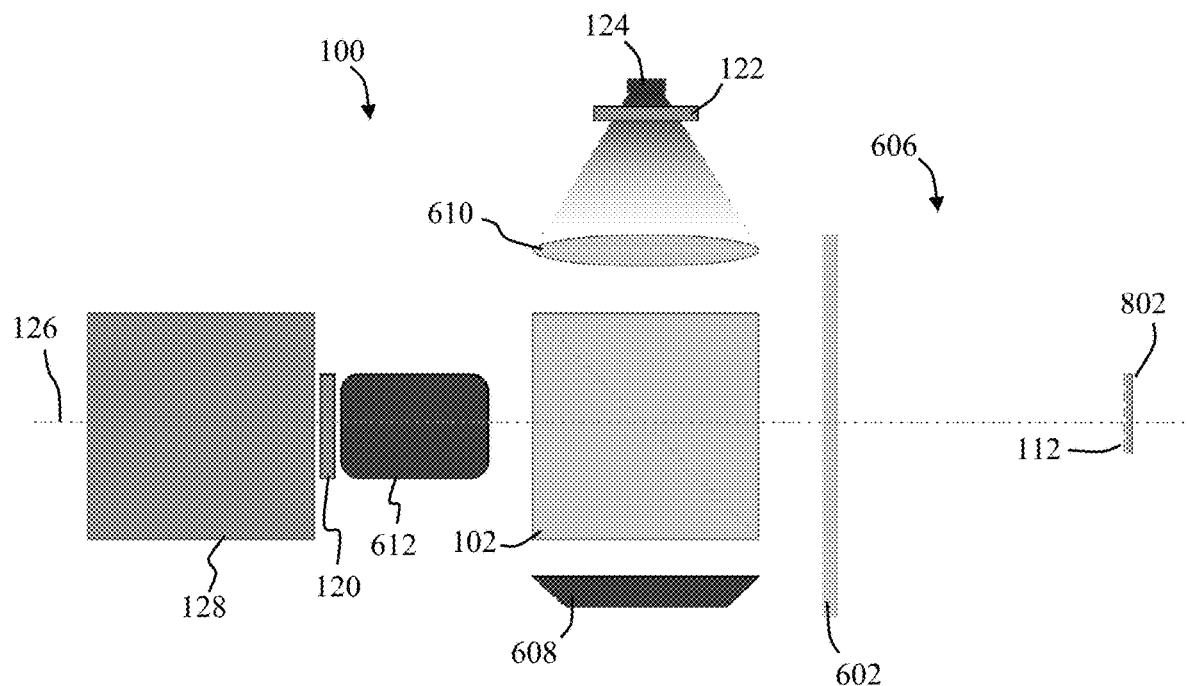
FIG. 8 representatively illustrates a projection system of a third glare reduction embodiment in accordance with an exemplary embodiment of the present technology.

With reference now to FIG. 7, in an alternate embodiment, the QWP 112 may be moved to a position immediately opposite the first window 602. For example, a wind tunnel facility may only provide optical access on only one side of the test section 606. In this embodiment the retroreflective background 116 is placed on a non-transmitting wall or surface of the interior of the wind tunnel or where a retroreflective target is placed on a wind tunnel model (e.g., for photogrammetric tracking). In this arrangement, the QWP 112 is placed on the side of the test section 606 window 602 closest to retroreflective background 116, ensuring any reflections off of the window 602 on the side closest to the imaging system are attenuated. In yet another embodiment, and referring now to FIG. 8, the QWP 112 may comprise a film that may be placed directly on the retroreflective target 802. For example, an optical adhesive may be used to fix the film to the retroreflective target 802 with a similar refractive index to the film, but with no polarization retardation.

These and other embodiments for methods of transmitting, reflecting, and refracting light may incorporate concepts, embodiments, and configurations as described above. The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the components and/or elements recited in any apparatus embodiment may be assembled or otherwise operationally configured in a variety of permutations to produce substantially the same result as the present technology and are accordingly not limited to the specific configuration recited in the specific examples.

As used herein, the terms "comprises," "comprising," or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to exemplary embodiments. However, changes and modifications may be made to the exemplary embodiments without departing from the scope of the present technology. These and other changes or modifications are intended to be included within the scope of the present technology, as expressed in the following claims.

What is claimed is:

1. A digital projection focusing optical system for measuring a test object in a test section of an instrument, comprising:
   a beam splitter configured to reflect an incident linear vertically polarized (LVP) light from a light source along an optical axis of the optical system;
   an LCD element positioned to receive the LVP light from the beam splitter, wherein the LCD element comprises a selectable pixel element configured to:
      generate a source grid comprising regions of the selectable pixel element switchable between a transparent state and an opaque state; and
      rotate the LVP light by ninety degrees to be liner horizontally polarized (LHP) light when regions of the generated source grid are in the transparent state;
   a polarizing prism configured to receive the LHP light from the LCD element and split the LHP light into two light beams, wherein:
      a first light beam comprising LHP light is refracted by a small angle relative to the optical axis and exits the polarizing prism at that small angle; and
      a second light beam comprising LVP light continues along and exits the polarizing prism aligned with the optical axis;
   a quarter-wave plate positioned between the polarizing prism and a retroreflective background, wherein the quarter-wave plate is configured to:
      modify the LVP light exiting the polarizing prism to right circularly polarized (RCP) light; and
      modify the LHP light exiting the polarizing prism to left circularly polarized (LCP) light; and
   an imaging lens positioned between the LCD element and the test section, wherein the imaging lens is configured to project the generated source grid onto the retroreflective background, wherein:
      the retroreflective background is configured to:
         reflect the incoming RCP light back towards the quarter wave plate and reverse the RCP light to LCP light;
         reflect the incoming LCP light back towards the quarter wave plate and reverse the LCP light to RCP light; and
         reflect an image of the projected source grid; and
      the imaging lens projects the reflected image of the source grid back onto the LCD element.

2. A digital projection focusing optical system according to claim 1, further comprising a linear polarizer positioned to receive the reflected RCP light and LCP light from the retroreflective background.

3. A digital projection focusing optical system according to claim 1, further comprising a linear polarizer positioned between the light source and the beam splitter to provide the LVP light to the beam splitter.

4. A digital projection focusing optical system according to claim 3, further comprising a condenser lens positioned between the light source and the linear polarizer.

5. A digital projection focusing optical system according to claim 1, wherein the LCD element comprises:
   a first polarizer positioned on a first side of the LCD element adjacent the selectable pixel element; and
   a second polarizer positioned on a second side of the LCD element, wherein the selectable pixel element is positioned between the first and second polarizers.

6. A digital projection focusing optical system according to claim 5, wherein:
   a transmission axis of the first polarizer comprises a transmission axis aligned with the beam splitter; and
   a transmission axis of the second polarizer is orthogonal to the transmission axis of the first polarizer.

7. A digital projection focusing optical system according to claim 1, wherein the beam splitter comprises a polarizing beam splitter configured to reflect LVP light along the optical axis of the instrument.

8. A digital projection focusing optical system according to claim 7, further comprising a half-wave plate positioned between the LCD element and the polarizing prism.

9. A method of measuring a test object in a test section of an instrument with a digital projection focusing optical system, comprising:
   directing an incident light source towards a beam splitter configured to reflect linear vertically polarized (LVP) light along an optical axis of the optical system towards an LCD element comprising a selectable pixel element;
   generating a source grid comprising regions of the selectable pixel element switchable between a transparent state and an opaque state;
   rotating the LVP light by ninety degrees to be liner horizontally polarized (LHP) light when regions of the generated source grid are in the transparent state;
   receiving the light from the LCD element with a polarizing prism configured to split the light into:
      a first light beam comprising LHP light is refracted by a small angle relative to the optical axis and exits the polarizing prism at that angle; and
      a second light beam comprising LVP light continues along and exits the polarizing prism aligned with the optical axis;
   passing the first and second light beams through a quarter-wave plate, wherein the quarter-wave plate is configured to:
      modify the first light beam exiting the polarizing prism at the small angle to left circularly polarized (LCP) light; and
      modify the second light beam exiting the polarizing prism along the optical axis to right circularly polarized (RCP) light;
   projecting the source grid generated by the LCD element onto a retroreflective background with an imaging lens;
   passing the RCP light and the LCP light beams through the test section and onto a retroreflective background, wherein the retroreflective background is configured to:
      reflect the incoming first light beam back through the test section at the small angle towards the quarter-wave plate as RCP light;
      reflect the incoming second light beam back through the test section along the optical axis towards the quarter-wave plate as LCP light; and
      reflected the projected source grid;
   passing the reflected first and second light beams through a quarter-wave plate a second time, wherein:
      the reflected first light beam passes through the quarter-wave plate at the small angle and is converted into LVP light;
      the reflected second light beam passes through the quarter-wave plate along the optical axis and is converted into LHP light;
   passing the reflected first and second light beams through the polarizing prism a second time, wherein:
      the first light beam continues through the polarizing prism at the small angle; and
      the second light beam is refracted by the small angle relative to the optical axis and exits the polarizing prism at the small angle; and
   projecting the reflected source grid onto the LCD element with the imaging lens;
   passing the first and second light beams to the LCD element, wherein at least one of the first and second light beams is prevented from passing through the LCD element; and
   the remaining light beam is directed through the beam splitter at the small angle to a sensor element.

10. A method of measuring a test object according to claim 9, further comprising positioning a linear polarizer between the beam splitter and the sensor element.

11. A method of measuring a test object according to claim 9, further comprising positioning a linear polarizer between the light source and the beam splitter.

12. A method of measuring a test object according to claim 11, further comprising positioning a condenser lens between the light source and the linear polarizer.

13. A method of measuring a test object according to claim 9, wherein the LCD element comprises:
   a first polarizer positioned on a first side of the LCD element adjacent the selectable pixel element; and
   a second polarizer positioned on a second side of the LCD element, wherein:
      the selectable pixel element is positioned between the first and second polarizers; and
      the second polarizer is oriented orthogonal to the first polarizer.

14. A method of measuring a test object according to claim 9, further comprising positioning a half-wave plate between the LCD element and the polarizing prism to convert the LHP light exiting the LCD element into LVP light.

* * * * *